Oct. 8, 1957   P. N. BRAUN ET AL   2,808,767
MACHINE FOR ATTACHING IDENTIFYING TAGS TO GARMENTS
Filed Nov. 21, 1955   8 Sheets-Sheet 1

INVENTOR.
JAMIESON A. FILSINGER
PHILIP N. BRAUN
BY
D. Emmett Thompson
Attorney

Oct. 8, 1957   P. N. BRAUN ET AL   2,808,767
MACHINE FOR ATTACHING IDENTIFYING TAGS TO GARMENTS
Filed Nov. 21, 1955   8 Sheets-Sheet 2

INVENTOR.
JAMIESON A. FILSINGER
PHILIP N. BRAUN
BY
D. Emmett Thompson
Attorney

Oct. 8, 1957 P. N. BRAUN ET AL 2,808,767
MACHINE FOR ATTACHING IDENTIFYING TAGS TO GARMENTS
Filed Nov. 21, 1955 8 Sheets-Sheet 6

Fig. 6

INVENTOR.
JAMIESON A. FILSINGER
PHILIP N. BRAUN
BY
D. Emmett Thompson
Attorney

Oct. 8, 1957  P. N. BRAUN ET AL  2,808,767
MACHINE FOR ATTACHING IDENTIFYING TAGS TO GARMENTS
Filed Nov. 21, 1955  8 Sheets-Sheet 8

INVENTOR.
JAMIESON A. FILSINGER
PHILIP N. BRAUN
BY D. Emmett Thompson
Attorney

United States Patent Office 2,808,767
Patented Oct. 8, 1957

2,808,767

MACHINE FOR ATTACHING IDENTIFYING TAGS TO GARMENTS

Philip N. Braun and Jamieson A. Filsinger, Syracuse, N. Y., assignors to Textile Marking Machine Co., Inc., Syracuse, N. Y., a corporation of New York Application November 21, 1955, Serial No. 548,079

7 Claims. (Cl. 93—88)

This invention relates to machines for affixing tags to garments, and other articles, to identify the same while they are being processed through a laundry, or dry cleaning plant. Such machines conventionally include a frame in which a stapling head is mounted, and an anvil carried by a supporting arm for movement toward and from the stapling head. An identifying tag formed of sheet material, such as treated paper tape, and having printed thereon proper identifying indicia, is positioned in front of the stapling head. The garment, or other article, is draped over the anvil carried by the pivoted arm, and the anvil is moved toward and into stapling engagement with the head, whereby a staple is ejected from the head through the tag and garment, and the prongs of the staple are bent over, or clinched, by the anvil.

This invention relates more particularly to a tag affixing machine of the type shown in the copending application, Ser. No. 507,757, of Philip N. Braun, filed May 12, 1955. In that machine, the tape is fed or advanced from a supply carried by the arm supporting the anvil, the end of the tape being fed outwardly from the anvil so that it may be shaped in V-formation in a holder mounted in juxtaposition to the anvil. The edge of the garment, or other article, is inserted in the V-shaped tag prior to the stapling operation, whereby the tag becomes affixed to the garment, or article, at the edge thereof and overlying both sides of the garment. This invention has as an object a tag affixing machine embodying the arrangement last mentioned and including mechanism for automatically folding the tag portion of the tape into V-formation, thus obviating the necessity of the operator folding the tag portion, of the tape by manipulating of the edge portion of the garment, or article.

The invention has as a further object a machine of this character embodying a tag holder structure by which the tag holder may be moved into and out of tag receiving position to permit the machine to function only with conventional tags which are stapled direct to one side of the garment only.

The invention consists in the novel features and in the combinations and constructions hereinafter set forth and claimed.

In describing this invention, reference is had to the accompanying drawings in which like characters designate corresponding parts in all the views.

In the drawings—

Figure 1:
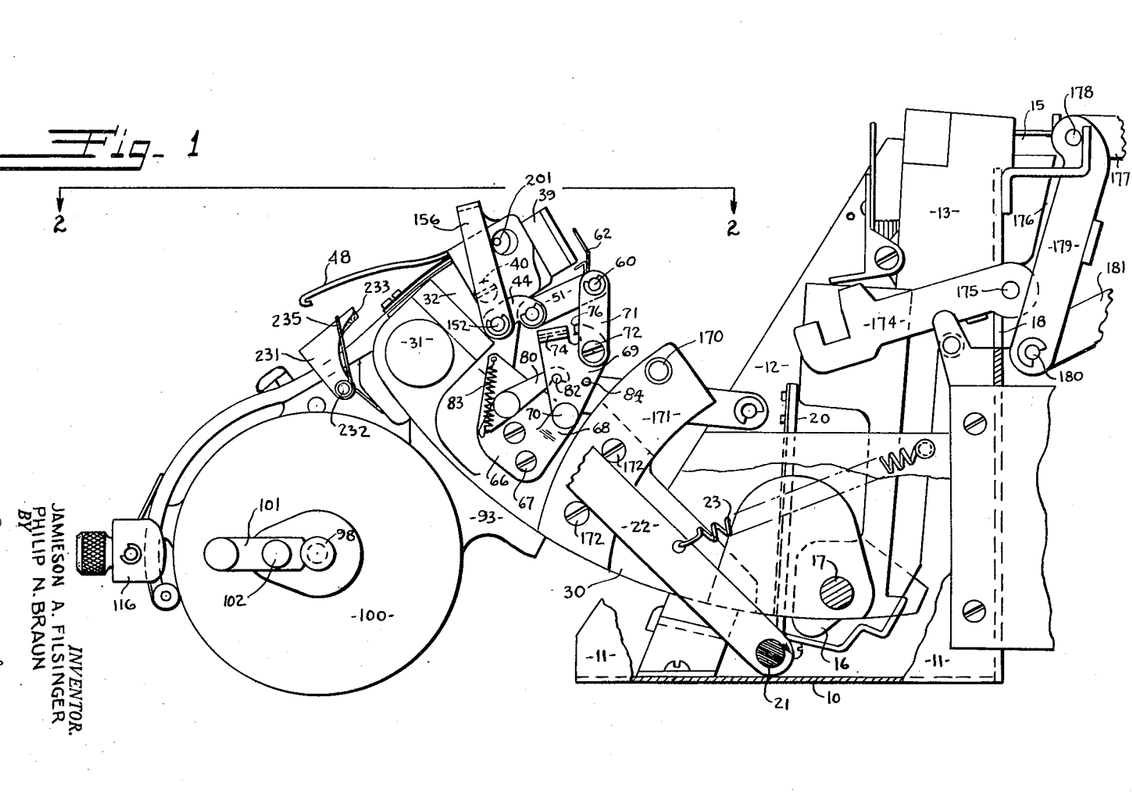
Figure 1 is a side elevational view of a machine embodying our invention with parts broken away and parts in section.

The stapling mechanism is mounted in a frame comprising a base plate 10 having spaced apart vertically disposed side members 11, 12. A stapling head 13 is positioned between the side members 11, 12, and has a staple ejector 15. The stapling head is provided at its lower end with a notched portion 16 positioned on a pivot pin 17, and the head is held positioned against a rear wall member 18 of the frame by an arm 20 extending upwardly from a shaft 21 journalled in the side members of the frame, and provided with a lever 22, acted upon by a tension spring 23, to urge the arm 20 against the stapling head to maintain the latter against the wall 18, as shown in Figure 1.

Figure 2:
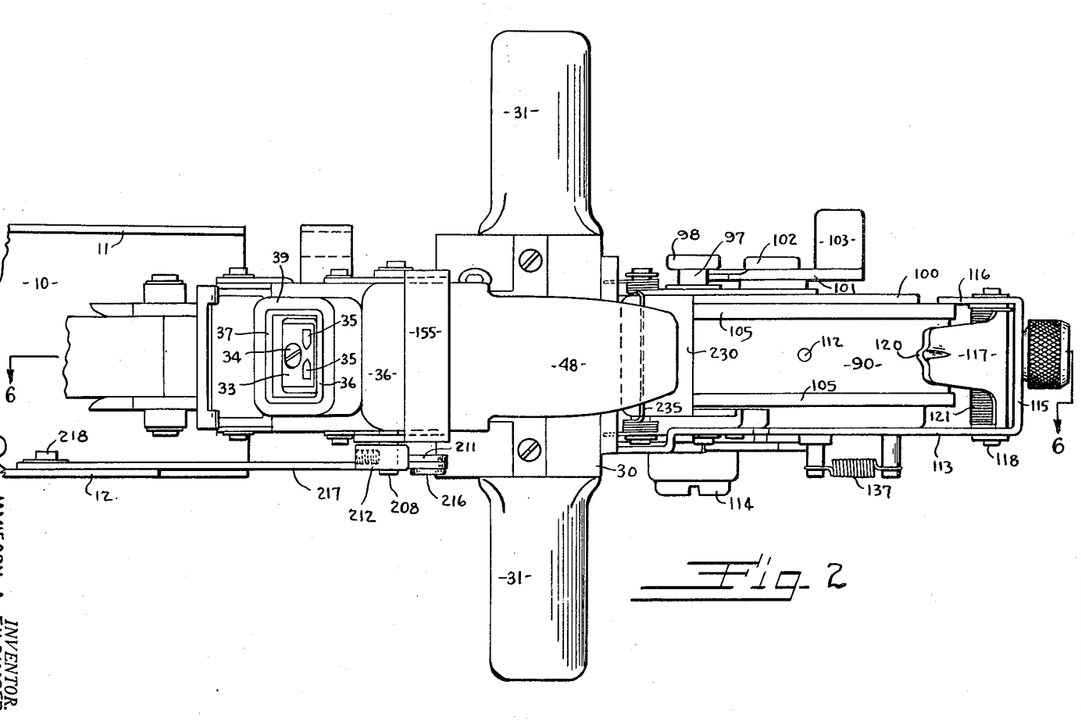
Figure 2 is a top plan view of the structure shown in Figure 1.

The mechanism to which this invention is particularly directed is carried by an arm 30 pivotally mounted on the pin 17, and provided at its outer end with laterally extending handle portions 31. An anvil 32 is attached to the arm and extends forwardly toward the stapling head 13. A hardened plate 33, see Figures 2 and 7, is attached to the forward end of the anvil, as by a screw 34, and is provided with concavities 35 to provide a clinching surface for the legs of the staples.

The major portion of the anvil is encircled by a box shaped garment support having a top wall 36, a bottom wall 37, and side walls 38. The forward portion of the garment support is encircled by a rubber band 39 of substantial thickness. The side walls 38 are apertured to receive pivot screws 40 threading into the sides of the anvil. A bracket 42 is secured to the under side of the anvil 32, as by screws 43, the bracket extending forwardly and being formed with spaced apart depending flanges 44. The under side of the anvil is formed with a recess 46, in which a compression spring 47 is mounted, and which acts against the bottom wall 37 of the garment support, urging it in a clockwise direction, Figures 6 and 7, the bracket 42 providing a stop for the support.

The top wall 36 is formed with a rearwardly extending handle portion 48, which may be pressed downwardly by the operator to shift the forward portion of the support, encircled by the band 39, upwardly. This effects upward movement of the garment relative to the clinching surface of the anvil whereby, upon the next engagement of the anvil and garment with the stapling head 13, a second staple will be driven through the tag and garment at a position above which the first staple was inserted. This arrangement of the movable garment support is accordingly for the purpose of driving two staples through the tag and garment, if it is desired to do so.

Figure 3:
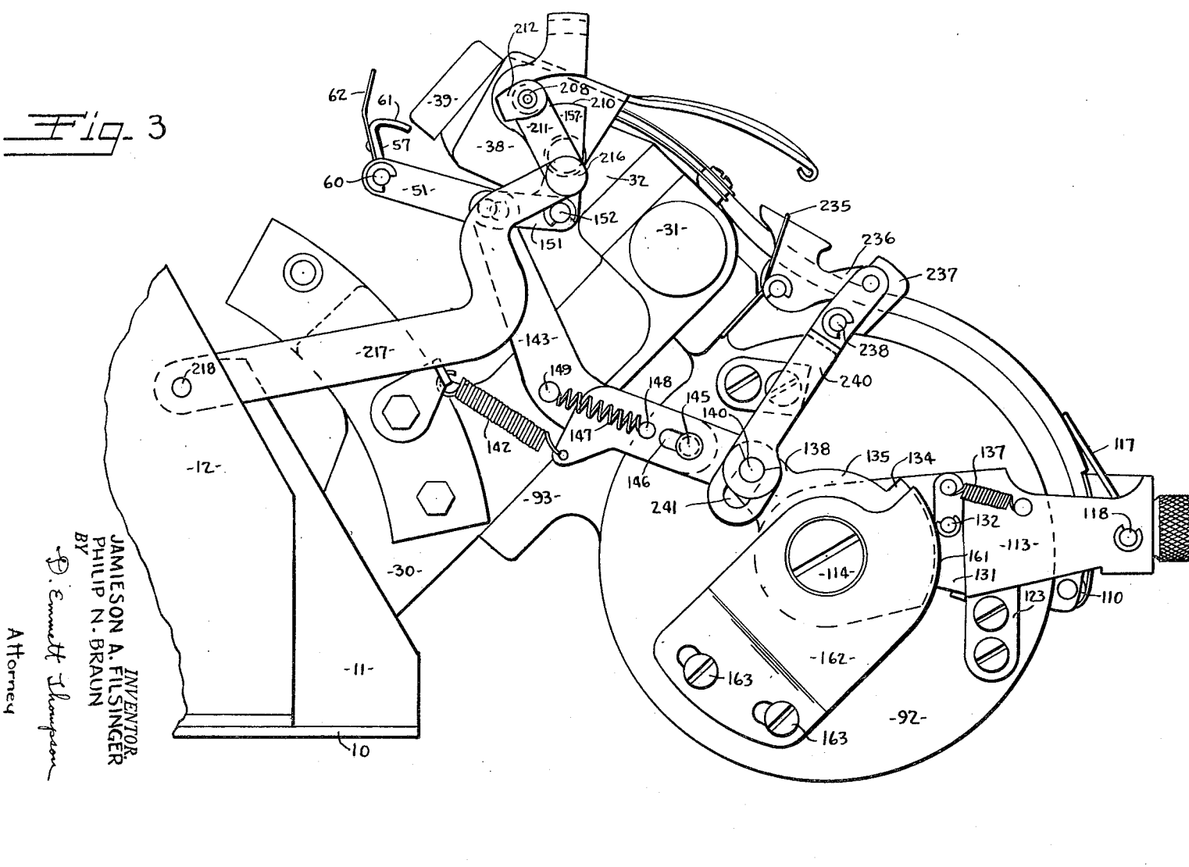
Figure 3 is a side elevational view of the side opposite to that shown in Figure 1, that is looking upwardly in Figure 2.
Figure 7:
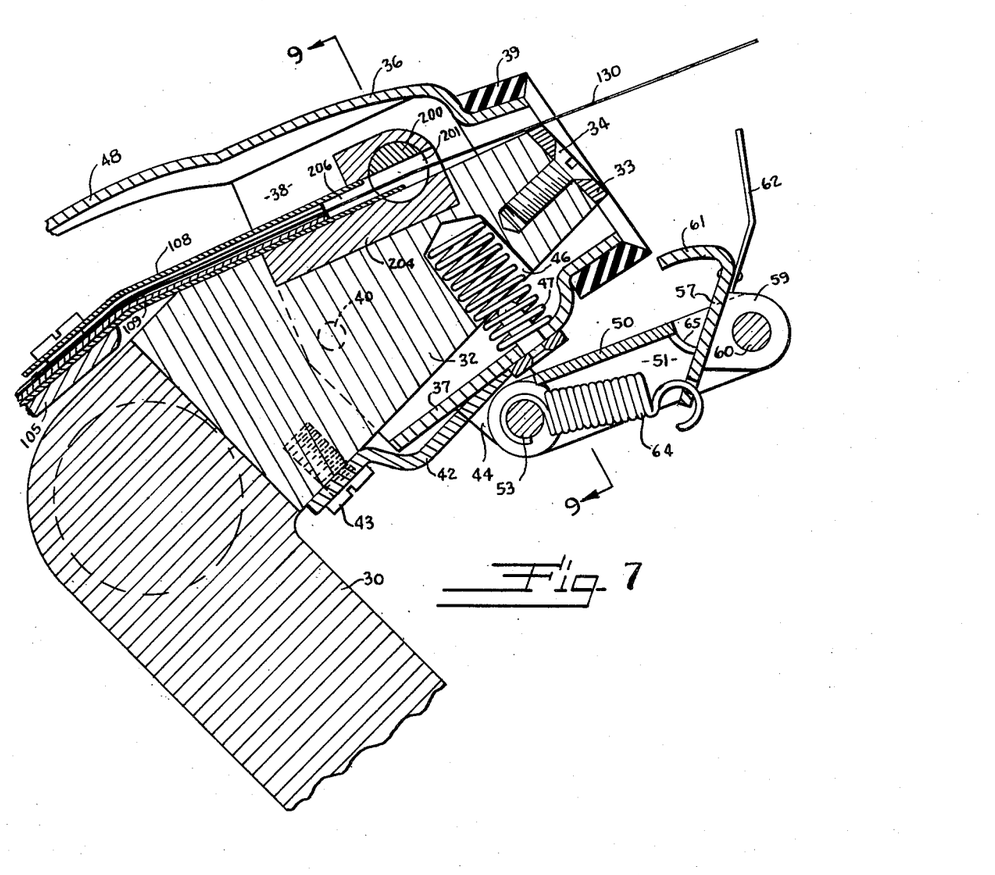
Figure 7 is an enlarged sectional view corresponding to the right portion of Figure 6.
Figure 9:
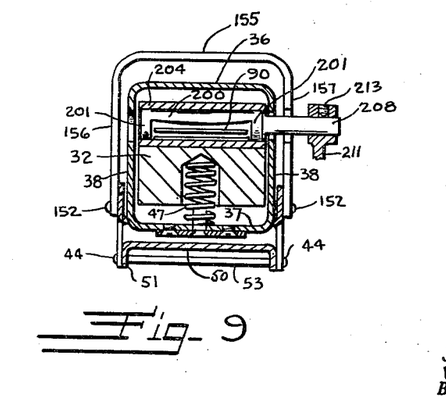
Figure 9 is a sectional view taken on a line corresponding to line 9—9, Figure 7.

A plate 50, having depending side flanges 51, is pivotally mounted between the depending ears 44 of plate 42 by means of a pin 53 extending through the ears and the side flanges 51 of the plate 50, see Figures 3, 7 and 9.

Another plate 57 is arranged between the forward ends of the side flanges 51 of plate 50, the plate 57 being formed with flanges 59 apertured to receive a pivot pin 60 extending through the flanges and through the ends of the flanges 51 of plate 50. The outwardly or upwardly extending edge of the plate 57 is bent rearwardly to form a tag supporting surface 61, and a spring blade 62 is secured to the plate 57 extending upwardly from the tag supporting surface 61. A tension spring 64, positioned between the flanges 51 of plate 50, is connected at one end to the pin 53 and at its opposite end to the lower edge of the plate 57, effecting clockwise movement of the plate until a stop portion 65 engages plate 50, see Figure 7. The plate 57, the portion 61 and blade 62 form the tag holder.

Referring now to Figure 1, a plate 66 is fastened to the side of the arm 30, as by screws 67, and is formed with an outwardly flared ear portion 68 on which the lower end of a link 69 is pivotally mounted, as at 70. A link 71 is pivotally connected at its lower end at 72 to the upper portion of link 69, and link 71 is pivotally connected at its upper end to one end of the pin 60.

Figure 8:
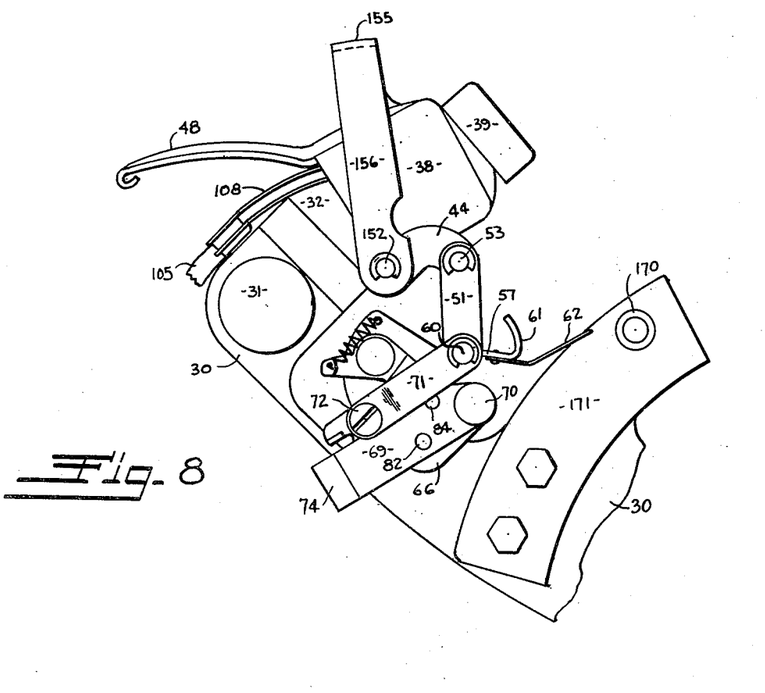
Figure 8 is a side elevational view, looking downwardly in Figure 2, of the outer portion of the anvil supporting arm and tag holder structure, with the latter being moved out of tag receiving position.

The link 69 is also formed at its upper end with a bent-out portion 74 which forms a handle part by which the link 69 may be conveniently moved about its pivot 70. The parts are normally positioned, as shown in Figure 1, with the central pivot 72 slightly advanced forwardly of the plane of the pivots 60, 70, and the lever 69 is formed with a small outwardly bent ear 76 to form a stop for movement of link 71 about its pivot 72. With the parts in this position, and as shown in Figures 1, 3, 4, 6 and 7, the tag supporting surface 61 is arranged in juxtaposition to the forward face of the anvil to receive the V-shaped tag, hereinafter referred to. The tag holder may be moved out of tag receiving position by movement of link 69 in a counter-clockwise direction, Figure 1, moving the central pivot 72 rearwardly to the position shown in Figure 8. This effects movement of the tag holder downwardly from the anvil. A detent lever 80, Figure 1, is pivotally mounted to the plate 66 and has at its free end a recess to engage a pin 82, the lever 80 being yieldingly held in engagement with the pin 82 by a spring 83. The link 69 is also provided with a pin 84 with which the lever 80 cooperates when the parts are moved to the position shown in Figure 8, the detent arm serving to yieldingly hold the tag holder either in or out of tag receiving position.

The tags are formed from sheet material in the form of a tape 90, a roll 91 of tape being positioned in a cylindrical housing 92 formed with a base portion 93 attached to the arm 30, as by screws 95. The housing 92 is formed with a centrally located stud 96 extending inwardly from one side wall and projecting outwardly from the opposite side of the housing, the outwardly extending portion 97 being of reduced diameter, see Figure 2, and having an outer head portion 98. This open side of the housing is covered by a disk 100 to which there is pivotally mounted a lever 101 on a headed rivet 102, the lever 101 being formed at one end with an outwardly extending handle portion 103. The opposite end of the lever is arranged to engage under the enlarged head 98 of the central stud, this arrangement serving as a means for conveniently detachably securing the cover disk to the housing.

Figure 6:
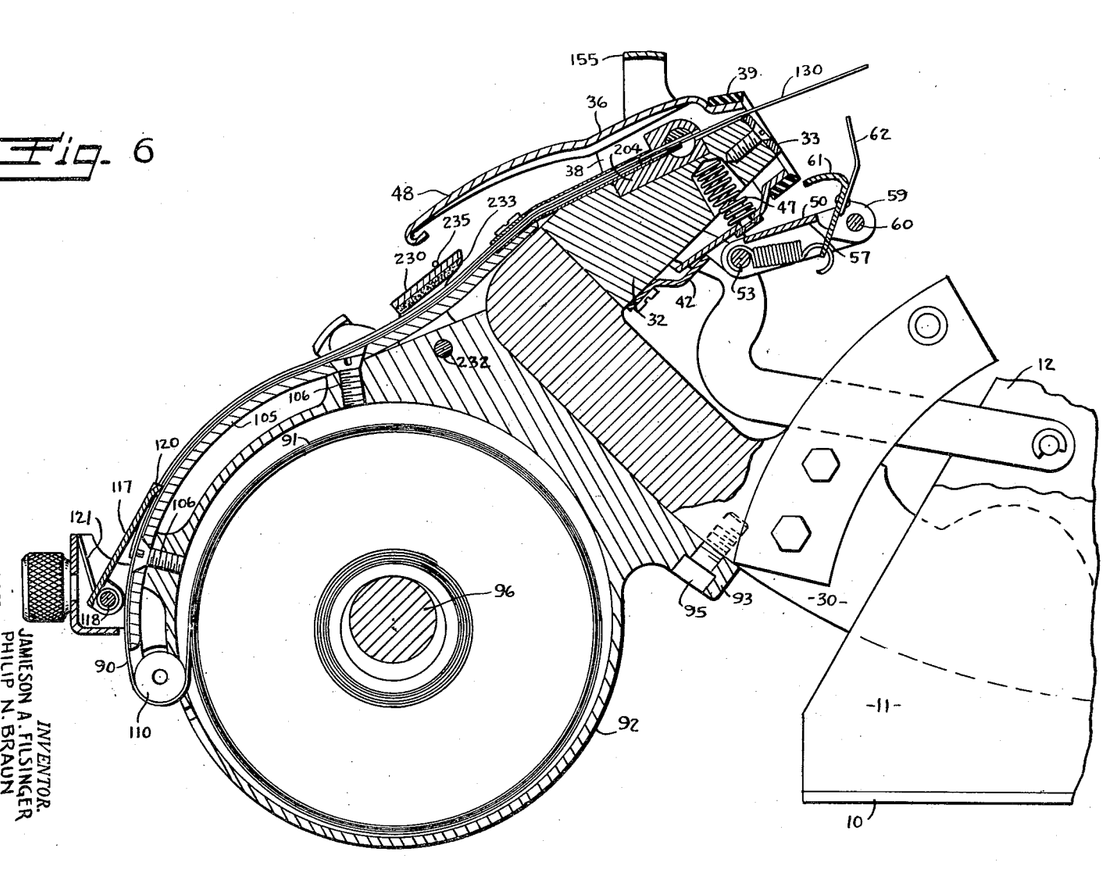
Figure 6 is a sectional view taken on a line corresponding to line 6—6, Figure 2.

A tape guide member 105 is detachably secured externally of the housing 92, as by screws 106, this guide member extending upwardly over the end of the arm 30 and having upper and lower sheet metal walls 108, 109, extending within the garment support, see Figures 6 and 7. The guide is provided at its lower end with a roller 110 over which the tape 90 is fed from the roll 91.

Figure 4:
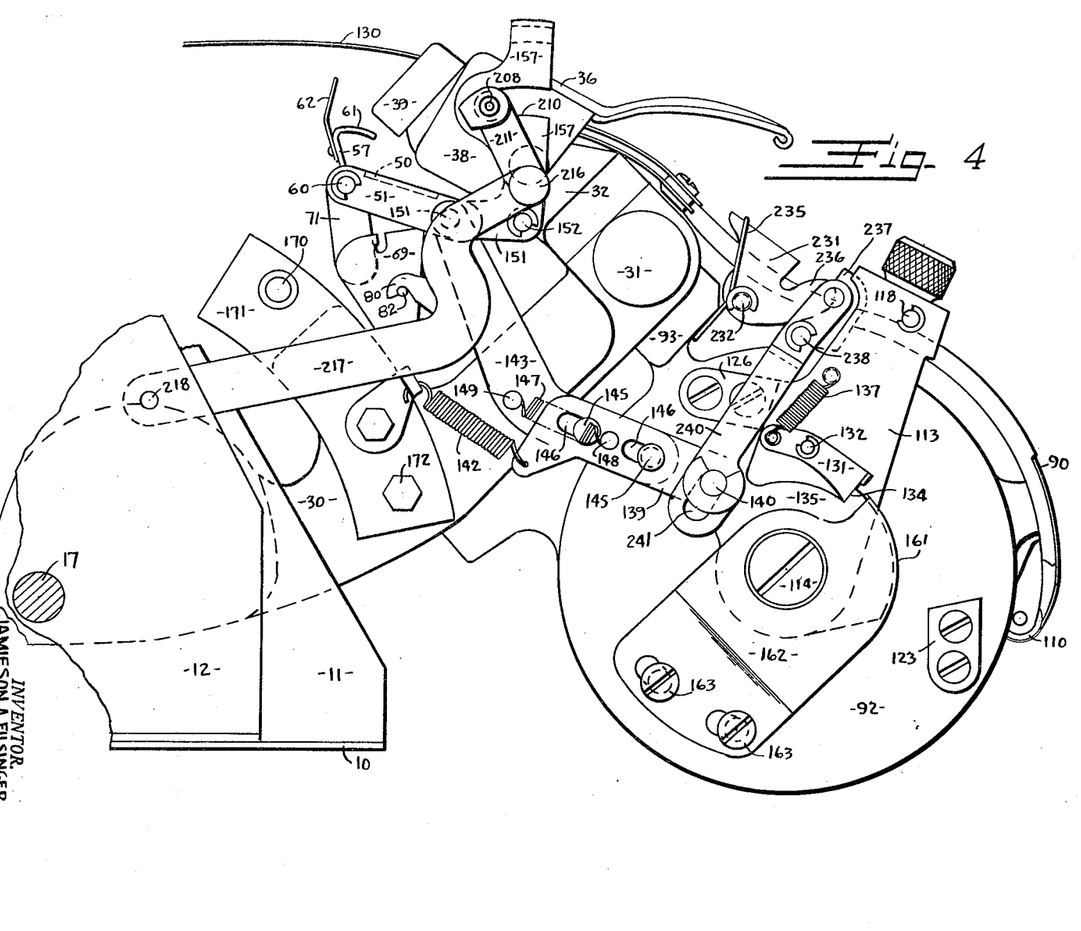
Figure 4 is a view similar to Figure 3 showing the tape feed actuated to position the end portion of the tape over the tag holder.

The tape is formed at spaced intervals with apertures 112, and the tape is fed from the roll by a tape feed consisting of an arm 113 pivotally mounted on a screw 114 threading into the central boss 96, the arm extending radially and having an outer portion 115 overlying the tape guide 105, and being bent inwardly to form a flange 116, see Figure 2. A tape engaging member 117 is pivotally mounted upon a pin 118 and is formed with a depressed portion 120 for entering the apertures 112. The tape engaging member 117 is yieldingly pressed against the tape in the guideway by a torsion spring 121, see Figure 6. The arm 113 is shown in its rear position, Figure 3, this position being determined by a stop member 123 fastened to the side wall of the housing 92. As the arm 113 is moved upwardly about the pivot screw 114, the depressed portion 120 of the member 117 engages one of the apertures 112, moving the tape 90 about the roller 110 and upwardly through the tape guide 105. This upward or forward movement of the arm 113 is limited by another stop member 126 as shown in Figure 4. In this position, the tape 90 has been fed to position the end portion 130 thereof outwardly over the tag holder 61, 62.

A pawl 131 is pivoted to the arm 113, as at 132. When the arm has reached the end of its forward movement by engagement with stop 126, the pawl 131 is urged against a radial shoulder 134 on a member 135 also journalled on the screw 114, the member 135 being positioned outwardly from the arm 113. The pawl 131 is actuated into engagement with the member 135 by a spring 137.

Figure 5:
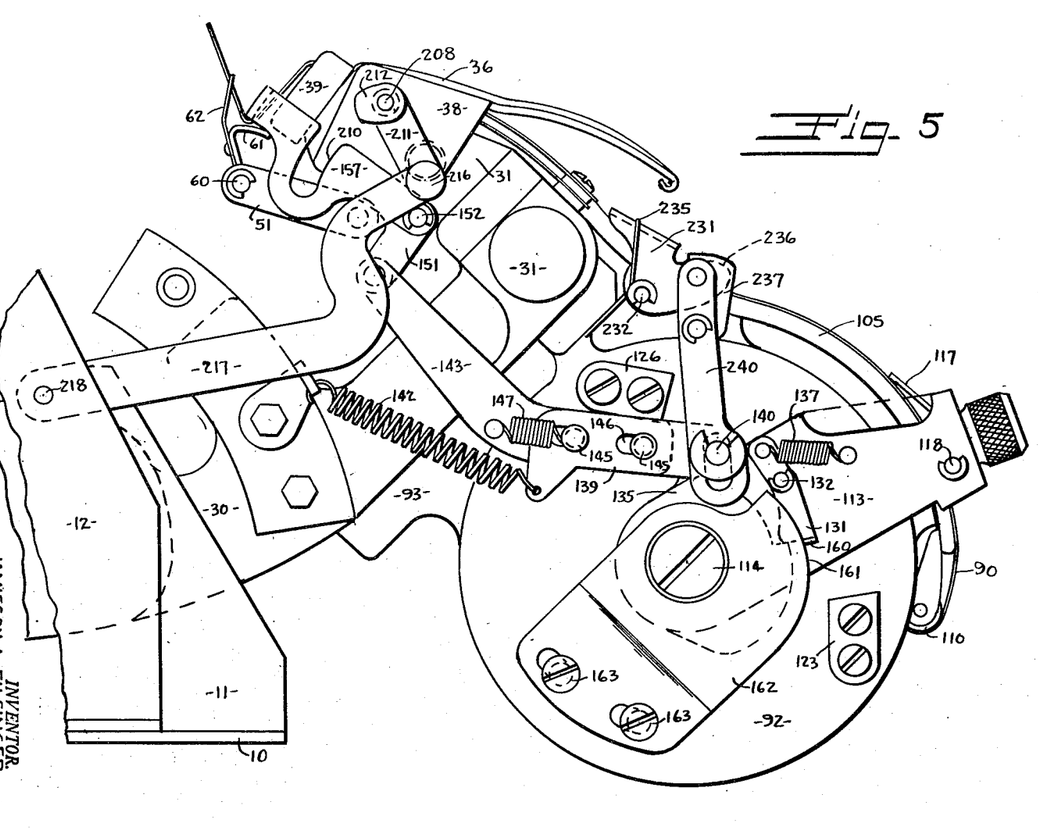
Figure 5 is a view, similar to Figures 3 and 4, showing the tape feeder returned to normal position, and the tag folder actuated to effect folding of the tag.

Rearward or downward movement of the arm 113 effects clockwise movement, Figures 3, 4 and 5, of the member 135. This member is formed with a radial projection 138 to which a link 139 is pivotally connected by pin 140. This effects rearward movement of the link 139 against the action of tension spring 142. A link 143 has a portion underlying the inner side of the link 139 and is provided with rivets 145 movable in elongated slots 146 formed in the link 139. The rivets 145 are maintained at the outer ends of the slots 146 by a tension spring 147, one end of which is secured to a pin 148 carried by the link 139, and the opposite end is secured to a pin 149 carried by a link 143.

The upper end of link 143 is pivotally connected at 150 to an arm 151 of a U-shaped folding member pivoted on pins 152 carried by ears also formed on the plate 42. This folding member is substantially U-shaped, see Figure 9, and has a top transversely extending portion 155 supported by substantially vertically disposed side or leg portions 156, 157.

Referring again to Figures 3, 4 and 5—Figure 3 shows the tape feed arm 113 in its retracted position. Figure 4 shows the tape feed arm in its advanced position, with the free end of the tape 130 fed outwardly from the anvil over the tape holder 61, 62. Figure 5 shows the tape feed member 113 moved rearwardly to a point near the stop member 123. This reaward movement of the member 113 has effected rearward movement of the link 139 and the link 143, effecting a counter-clockwise movement of the tag folder, Figures 3, 4 and 5, to the position shown in Figure 5, the top transverse portion of the folder 155 having moved over the garment support, engaged the end portion 130 of the tape, and folded it downwardly into the tag holder, as shown in Figure 5.

When the folder has thus folded the extended portion of the tape and engaged the tag holder 61, further movement of the folder is thus arrested, and further movement of the link 139 rearwardly is against the action of the spring 147. During the rearward movement of the member 113 from the position shown in Figure 4 to the position shown in Figure 5, the laterally extending portion 160 of pawl 131 has moved along the cam surface 161 of a bracket 162 secured to the housing 92, as by screws 163. The cam surface 161 is arranged to cam the pawl 131 radially outwardly from the pivot screw 114, when the member 113 approaches and engages the stop 123. This over-run movement of the member 135 is provided for by the elongated slots 146 in link 139. When the cam surface 161 cams the pawl 131 radially outwardly from engagement with the shoulder 134, the springs 147, 142, effect forward movement of the links 139, 143, and clockwise return movement of the tag folder to return it to its normal position shown in Figures 3 and 4. This mechanism accordingly automatically effects a folding of the extended portion of the tape 130 into V-formation in the tag holder, whereby the operator only has to drape the edge portion of the garment, or article, over the garment support and anvil, with the edge of the garment or article positioned in the folded V tag.

The operator then moves the arm 30 about its pivot 17 to bring the anvil in proximity to the stapling head 13. At this time, pins 170 carried by the arcuate sections 171 secured to the arm 30, as by screws 172, interlock with the outer hooked end portions of links 174. These links 174 are pivotally connected as at 175, Figure 1, to an angle link 176, 177, pivotally supported, as at 178, by the upper ends of links 179, the lower ends of which are pivoted, as at 180, to the frame. The link 177 is interconnected to a link 181, and these links 177, 181, are operated by a prime mover, such as a solenoid or hydraulic cylinder, the specific mechanism being more clearly disclosed in the copending application, Ser. No. 507,757. This power operated linkage effects a squeezing action between the arm 30, and the staple ejector 15, to cause a staple to be ejected from the head 13 through the garment and both portions of the V-shaped tag arrangement shown in Figure 5.

At substantially the same time that the staple is ejected through the garment and the tag, the tag is severed from the tape 90. This is accomplished by a cutter 200 (see Figure 7) having circular end portions 201 journalled for rotation in a block 204. This block 204 is fixedly mounted in the anvil 32, the block being formed with a transversely extending cylindrical bore in which the cutter is mounted and a transversely extending slot 206 through which the tape is advanced. The cutter is formed with a laterally extending shaft 208 extending outwardly through a slot formed in one of the side walls 38 of the garment support, and the side leg 157 of the tag folder is formed with an arcuate slot 210 to provide clearance for the shaft portion of the cutter.

An arm 211 is provided with an enlarged head portion 212 mounted on the shaft 208 and fixed thereto, as by set screw 213, see Figure 9. The arm 211 is pivotally connected at 216 to a link 217, the opposite end of which is connected to the side wall 12 of the frame by pin 218.

Normally the cutter is positioned as shown in Figures 6 and 7 to permit feeding or advancement of the tape 90 through the block 204. When the anvil is moved in proximity to the stapling head 13, the links 217, 211, effect counter-clockwise rotation of the cutter, Figures 3, 4 and 5, and clockwise rotation, Figures 6 and 7, whereby the intermediate portion of the cutter 200 cooperates with the block 204 to sever the tag portion 130 from the tape.

In order to make certain that the tape 90 does not move or become displaced during the cutting operation, means is provided for clamping the tape against the guideway 105. This means consists of a U-shaped member having a top wall 230 and side walls 231 pivoted at 232 to the housing 92, the top wall 230 being provided at its under surface with friction material, such as rubber 233, see Figures 1 and 6. The clamp member is urged toward the guideway by a torsion spring mounted on the ends of the pivot 232 and having a loop portion 235 passing over the top wall 230 of the clamp, see Figures 2 and 4. One side wall 231 of the clamp is formed with a rearwardly extending portion 236. A cam block 237 is mounted for pivotal movement on a pin 238 carried by the roll housing 92, and there is an arm 240 fixedly secured to the cam block 237 and being formed at its lower end with an elongated slot 241 to receive the pivot pin 140. With this arrangement, upon clockwise movement of the member 135, upon rearward movement of the feed member 113, the cam block 237 is moved counter-clockwise. Normally, the cam block 237 is arranged to depress the rearward portion 236 of the clamp member to maintain it out of engagement with the tape, but upon movement of the member 113 from the position shown in Fig. 5 to the position shown in Figure 3, the cam block 237 is moved out of engagement with the portion 236 of the clamp, permitting the clamp to be urged against the tape by the spring 235.

It will be observed that operation of the tape feed arm 113 not only effects feeding of the tape but also folding the end into a V-shaped tag positioned in the tag holder. The feeding of the tape is uniform and accordingly, the size and folding of the tag is uniform. This result is obtained without any direction or skill on the part of the machine operator.

What we claim is:

1. A machine for stapling identifying tags to garments and the like, a frame, a stapling head mounted on the frame, an anvil assembly mounted in the frame for movement toward and from the stapling head into and out of stapling engagement therewith, a tag holder mounted on said anvil assembly, means carried by said assembly for supporting a supply of tape, tape feeding means operable to advance the tape from said supply toward the anvil with the end portion of the tape projecting forwardly from the anvil and over said tag holder to provide a tag forming portion, a tag folder carried by said anvil assembly and movable when actuated over said anvil and downwardly into engagement with the tag forming portion of the tape to fold the same in V formation and position the folded portion in said holder whereby the legs of the V-shaped tag are stapled together through the garment or the like when an edge of the garment is inserted in the apex of the folded tag and the stapling head is moved into stapling engagement with the anvil assembly, and tape severing means operable to sever said folded end portion from the tape.

2. A machine for stapling identifying tags to garments and the like, a frame, a stapling head mounted on the frame, an anvil support member, an anvil member carried by said support member and having an end surface cooperable with the stapling head when the anvil is moved into staple clinching relation to said head to clinch the staple, said support member being movable toward and from said stapling head to bring the anvil member into and out of staple clinching relation with the stapling head, a tag holder mounted on one of said members for receiving and supporting a tag of V formation with an exposed portion of the tag in registration with said stapling head, whereby the edge of a garment may be inserted in the folded tag positioned in said holder preparatory to the stapling of the tag to the garment, means carried by said anvil support member for supporting a supply of tape, a tape feeding means operable to advance the tape from said supply toward the anvil with the end portion of the tape projecting over said tag holder to provide a tag forming portion, a tag folder carried by one of said members and being movable, when actuated, over the clinching surface of said anvil and downwardly into engagement with said tag forming portion of the tape to fold the same in V formation and position the folded portion in said holder, whereby the legs of the folded tag may be stapled together with an edge of the garment or the like therebetween, and tape severing means operable to sever said folded end portion from the tape.

3. A machine for stapling identifying tags to garments and the like, a frame, a stapling head mountd on the frame, an anvil support member, an anvil member carried by said support member and having an end surface cooperable with the stapling head when the anvil is moved into staple clinching relation to said head to clinch the staple, said support member being movable toward and from said stapling head to bring the anvil member into and out of staple clinching relation with the stapling head, a tag holder mounted on one of said members for receiving and supporting a tag of V-formation with an exposed portion of the tag in registration with said stapling head, whereby the edge of a garment may be inserted in the folded tag positioned in said holder preparatory to the stapling of the tag to the garment, means carried by said anvil support member for supporting a supply of tape, a tape feeding member operable upon movement towards said anvil to advance the tape from said supply toward the anvil, with the end portion of the tape projecting over said tag holder to provide a tag forming portion, a tag folder carried by one of said members and being movable toward and from said tag holder, motion transmitting means connecting said tag folder and said tape feed means and operable upon return movement of said tape feed means to effect such movement of said tag folder, said tag folder being operable upon movement toward said tag holder to engage and fold the projecting portion of the tape into V-formation and position the folded portion in said holder, and tape severing means carried by the anvil and operable as the same is moved into proximity with the stapling head to sever said folded tag portion from the tape.

4. A machine for stappling identifying tags to garments and the like, a frame, a stapling head mounted on the frame, an anvil support member, an anvil member carried by said support member and having an end surface cooperable with the stapling head when the anvil is moved into staple clinching relation to said head to clinch the staple, said support member being movable toward and from said stapling head to bring the anvil member into and out of staple clinching relation with the stapling head, a tag holder mounted on one of said members for receiving and supporting a tag of V-formation with an exposed portion of the tag in registration with said stapling head, whereby the edge of a garment may be inserted in the folded tag positioned in said holder preparatory to the stapling of the tag to the garment, means carried by said anvil support member for supporting a supply of tape, a tape feeder operable upon movement toward said anvil to engage and advance the tape toward the anvil, with the end portion of the tape projecting outwardly therefrom and being disposed above said holder, a tag folder pivotally mounted on said anvil, motion transmitting means connecting said folder to said tape feeder to effect pivotal movement of said tag folder upon movement of the tape feeder rearwardly from the anvil, said tape folder being operable upon such pivotal movement to engage the projecting end portion of the tape and fold the same into V-formation in said holder, a rotary cutter journalled in the anvil, motion transmitting means connecting said cutter with the frame of the machine and operable when the anvil is positioned in proximity to said stapling head to sever the folded tag portion from the tape.

5. A machine, as set forth in claim 4, wherein said tag folder consists of a U-shaped member having its leg portions overlying the sides of the anvil and being pivotally connected thereto, the intermediate portion of said U-shaped member being movable about said pivotal mounting over the clinching face of the anvil to engage and fold the projecting portion of the tape.

6. A machine for affixing identifying tags to garments and the like, a frame, a stapling head mounted on the frame, an anvil support, an anvil carried by said support, said support being movable toward and from said stapling head to bring the anvil into and out of staple clinching relation with the stapling head, a tag holder carried by said anvil for holding a tag in staple receiving position, a housing carried by said anvil support, means for supporting a roll of tape in said housing, a tape guideway extending from said housing to said anvil, a tape feeder mounted on said housing for movement along said guideway and having a tape engaging member operable upon movement of said feeder towards the anvil to engage and advance the tape toward the anvil with the end portion of the tape projecting therefrom above the tag holder, a tag folder pivotally mounted on the anvil and being normally positioned above the anvil, linkage connected to said tape feeder and said folder and being operable upon movement of the tape feeder rearwardly from the anvil to effect movement of said folder downwardly over the face of the anvil for engaging and folding the projecting end portion of the tape into V-formation in said holder, spring means operable to return said folder to normal position, and tape severing means carried by the anvil and being operable to sever the folded end portion of the tape.

7. A machine for affixing identifying tags to garments and the like, a frame, a stapling head mounted on the frame, an anvil support, an anvil carried by said support, said support being movable toward and from said stapling head to bring the anvil into and out of staple clinching relation with the stapling head, a tag holder carried by said anvil for holding a tag in staple receiving position, a housing carried by said anvil support, means for supporting a roll of tape in said housing, a tape guideway extending from said housing to said anvil, a tape feeder mounted on said housing for movement along said guideway and having a tape engaging member operable upon movement of said feeder toward the anvil to engage and advance the tape toward the anvil with the end portion of the tape projecting therefrom above the tag holder, a tag folder pivotally mounted on the anvil and being normally positioned above the anvil, linkage associated with said folder, a pawl carried by said feeder and movable into engagement with said linkage when said feeder is advanced in juxtaposition to said anvil, and a cam member to move said pawl out of engagement with said folder linkage upon return movement of said feeder from the anvil, said linkage being operable during engagement of said pawl to move said folder about said anvil to engage and fold the extended portion of the tape into V-formation and position the same in said holder, and spring means operable to return said folder to normal position upon disengagement of said pawl, and tape severing means carried by the anvil and being operable to sever the folded end portion of the tape.

References Cited in the file of this patent

UNITED STATES PATENTS

| | | |
|---|---|---|
| 1,048,136 | Davis | Dec. 24, 1912 |
| 2,023,045 | Flood | Dec. 3, 1935 |
| 2,042,816 | Whitman | June 2, 1936 |
| 2,690,104 | Schwartz et al. | Sept. 28, 1954 |